United States Patent [19]

Ando

[11] Patent Number: 4,999,704
[45] Date of Patent: Mar. 12, 1991

[54] SYSTEM FOR EFFICIENTLY CODING A MOVING-PICTURE SIGNAL, CAPABLE OF SELECTING SEVERAL DIFFERENT CODING SYSTEMS

[75] Inventor: Ichiro Ando, Yokohama, Japan

[73] Assignee: Victor Company of Japan, Ltd., Yokohama, Japan

[21] Appl. No.: 453,306

[22] Filed: Dec. 22, 1989

[30] Foreign Application Priority Data

Dec. 26, 1988 [JP] Japan ................... 63-326282

[51] Int. Cl.⁵ ............................................. H04N 7/12
[52] U.S. Cl. ..................................... 358/133; 358/136
[58] Field of Search ........................ 358/136, 135, 133

[56] References Cited

U.S. PATENT DOCUMENTS 4,485,402 11/1984 Searby ........................... 358/136 X Primary Examiner—Victor R. Kostak
Attorney, Agent, or Firm—Fleit, Jacobson, Cohn, Price, Holman & Stern

[57] ABSTRACT

An efficient coding system for a moving picture signal is provided, which comprises a large number of detection elements for individually picture signals corresponding to respective frames of a plurality of successive frames, a plurality of group signal detection elements for detecting, as a set of groups, picture signals with respect of the entirety of a plurality of detection elements constituting several successive groups, each group comprised of a several number of the detection elements, a change quantity detection element for detecting in sequence change quantities of signals of two successive groups, a judgment element for judging whether or not the change quantity is above a predetermined quantity, a plurality of efficient coding elements of different types for predicting a difference between the picture signals and coding it, or for coding it on the basis of polarization of a power spectrum of the picture signals in order to remove redundancy of a group of the picture successive signals to code them, and a select element for selecting and outputting data having a smaller data content coded by the coding elements when the change quantity of the picture signals is above the predetermined quantity.

13 Claims, 9 Drawing Sheets

SYSTEM FOR EFFICIENTLY CODING A MOVING-PICTURE SIGNAL, CAPABLE OF SELECTING SEVERAL DIFFERENT CODING SYSTEMS

BACKGROUND OF THE INVENTION

This invention relates to an efficient coding system for a moving picture signal which is constructed to permit various signals to be efficiently coded by small information content.

For coding a moving picture signal with high efficiency, various systems described below have been proposed. For example, there is a known system which performs predictive coding of a moving picture signal. Further, there is a known system which codes orthogonal transform coefficients obtained by applying orthogonal transformation to the moving picture signal. In addition, there is a known system which is a combination of the systems of the two previously described. This third type system has both functions of the predictive coding system and the orthogonal transform system.

In the above-mentioned systems, in the case where picture signals corresponding to successive frames are partitioned or divided into picture signals. A frame group is defined which is comprised of a predetermined number of frames and are coded in such a state. The time period subject to the influence when any coding error would occur at the time of transmission of coded data or at the time of recording/reproducing can be shortened, and random reproduction can be efficiently realized at the time of recording/reproducing.

In implementation of coding, there is ordinarily employed a scheme to carry out such a variable length coding corresponding to the predictive error values or the orthogonal transform coefficient values to allot short length codes to predictive error values or orthogonal transform coefficient values having a high probability of occurence and to allot long length codes to predictive error values or orthogonal transform coefficient values having a low occurrence probability, thus making it possible to compress the information content as a whole.

During the variable length coding described above, coded data are temporarily stored into the buffer memory in order to match the output speed of the data in the form of variable length codes with the data transmission speed in the transmission path.

However, all the above-described conventional coding systems having the following problems.

First, when the content of a picture displayed on the screen is suddenly and greatly changed, correlation between pictures before and after that change is reduced, resulting in increased volume of coded data. Accordingly, there is the possibility that the buffer memory for storing coded data may overflow. For this reason, there is the problem that the picture is subjected to deterioration, possibly to such an extent that a picture decoded and reproduced on the screen becomes broken. Examples of this type of sudden change are scene change and sudden fade-in and fade-out, etc. Further, where the intraframe or interframe correlation between moving picture signals is strong, a change in the coded moving picture signal is small, resulting in small volume of coded data. Accordingly, there is low possibility that the above-mentioned buffer memory may overflow. As a result, the problem of the above-described deterioration of the reproduced picture does not occur.

Several countermeasures to prevent the deterioration of the reproduced picture resulting from the above-mentioned sudden change in the picture content have been proposed. For example, the interframe coding system utilizing correlation between pictures includes means for inhibiting the operation of the interframe coder by a stop signal when it is predicted that overflow may occur in the buffer memory.

However, the stop means has the inconvenience that if there is any asynchronization in the stop timing, a frame before the stop operation and a new frame overlap with each other on the same screen, or movement of the moving picture becomes discontinuous. Other problems can also result from asynchronization.

Further, as a different example for preventing deterioration of the reproduced picture, there is a deterioration prevention device constructed so that when the volume of the coded data exceeds a predetermined storage content of the buffer memory, only the frame dropping code is transmitted in order to drop frames until the storage content falls below a predetermined content.

However, with this arrangement there are instances where coding and decoding processing become complicated and the number of frames to be dropped is increased depending upon the frame dropping control timing within a group of frames, resulting in unnatural reproduced pictures.

In addition, there has been also proposed a predictive coding system or a transform coding system for a moving picture signal. In accordance with such a system, in order to prevent the buffer memory from overflowing when the picture content is suddenly changed such as by a scene change, resulting in an increased volume of information a technique is employed to predict a quantity of changes in the picture content between frames resulting from scene change or sudden fade-in or fade-out, in a moving picture signal subject to coding to limit, to a small value, the dynamic range of an output from a quantizer when the picture content suddenly changes to a great degree. Therefore, the quantity of changes exceeds a predetermined quantity, to gradually expand the dynamic range limited at a relatively slow rate, thereby returning the limited range to a predetermined dynamic range.

However, the last-mentioned system has the problem that occurs in a picture for a time period from the time when the dynamic range of the output from the quantizer is limited to a small value until the limited range is gradually expanded at a slow rate and is then returned to a predetermined dynamic range.

SUMMARY OF THE INVENTION

An object of a coding system for a moving picture signal according to this invention is to suitably combine coding means of different types to select output data of smaller data content thereby preventing deterioration in a picture resulting from a sudden change of the picture content.

The system according to this invention comprises means for partitioning picture signals corresponding to successive frames into picture signals. A frame group is defined which is comprised of a predetermined number of frames to thereby provide picture signals corresponding to individual frame groups, respectively; means for detecting a quantity of changes in the picture content between adjacent frames in the group of frames with respect to the picture signals in every individual frame groups; means for judging whether or not the quantity of changes of the picture content exceeds above a predetermined quantity; and signal generating means wherein when a frame preceding on the time base of two frames successive on the time base which has caused the judgement result that the change quantity of the picture content exceeds above the predetermined quantity is assumed or designated as a first frame, and the other frame of the two frames is assumed or designated as a second frame. The signal generating means is operative to generate a picture signal corresponding to either the state where the second frame and all other frames subsequent thereto in a group of frames is replaced with the first frame or the state where all the frames from the leading frame of the group of frames to the first frame is replaced with the second frame to apply the predictive coding to the picture signal, or to encode a moving picture signal by the technique in which the technique used in the predictive coding system and the technique used in the orthogonal transform coding system are combined, or to encode a moving picture signal by the technique in which the technique used in the predictive coding system and the technique used in the orthogonal transform coding system are combined, thus to select and output data which is small in the data content of the data respectively individually coded by a plurality of coding systems of different types.

By employing the system constructed as described above, picture signals corresponding to frames successive on the time base are partitioned into picture signals with every picture group being comprised of a predetermined number of frames to generate picture signals corresponding to individual picture groups, respectively. Further, this system adopts an approach to detect a change in the amount of the picture content between consecutive frames in a group of frames with respect to picture signals in every individual frame groups, whereby the frame preceding two frames in which the change quantity of the picture content exceeds a predetermined quantity is assumed as a first frame, and the other frame of the two frames is assumed as a second frame. The system is operative to generate a picture signal corresponding to either the state where the second frame and the all other frames subsequent thereto in the group of frames are replaced with the first frame or the state where all the frames from the leading frame of the group of frames to the first frame is replaced with the second frame, thus making it possible to apply predictive coding of the picture signal, or encode a moving picture signal by the technique in which the technique used in the predictive coding system and the technique used in the orthogonal transform coding system are combined, or to encode a moving picture signal by the technique in which the technique used in the predictive coding system and the technique used in the orthogonal transform coding system are combined to select output data having small data content of data respectively and individually coded by the plurality of coding systems of different types and output the data thus selected.

DETAILED DESCRIPTION OF THE PREFERRED EMBODIMENTS

Figure 1:
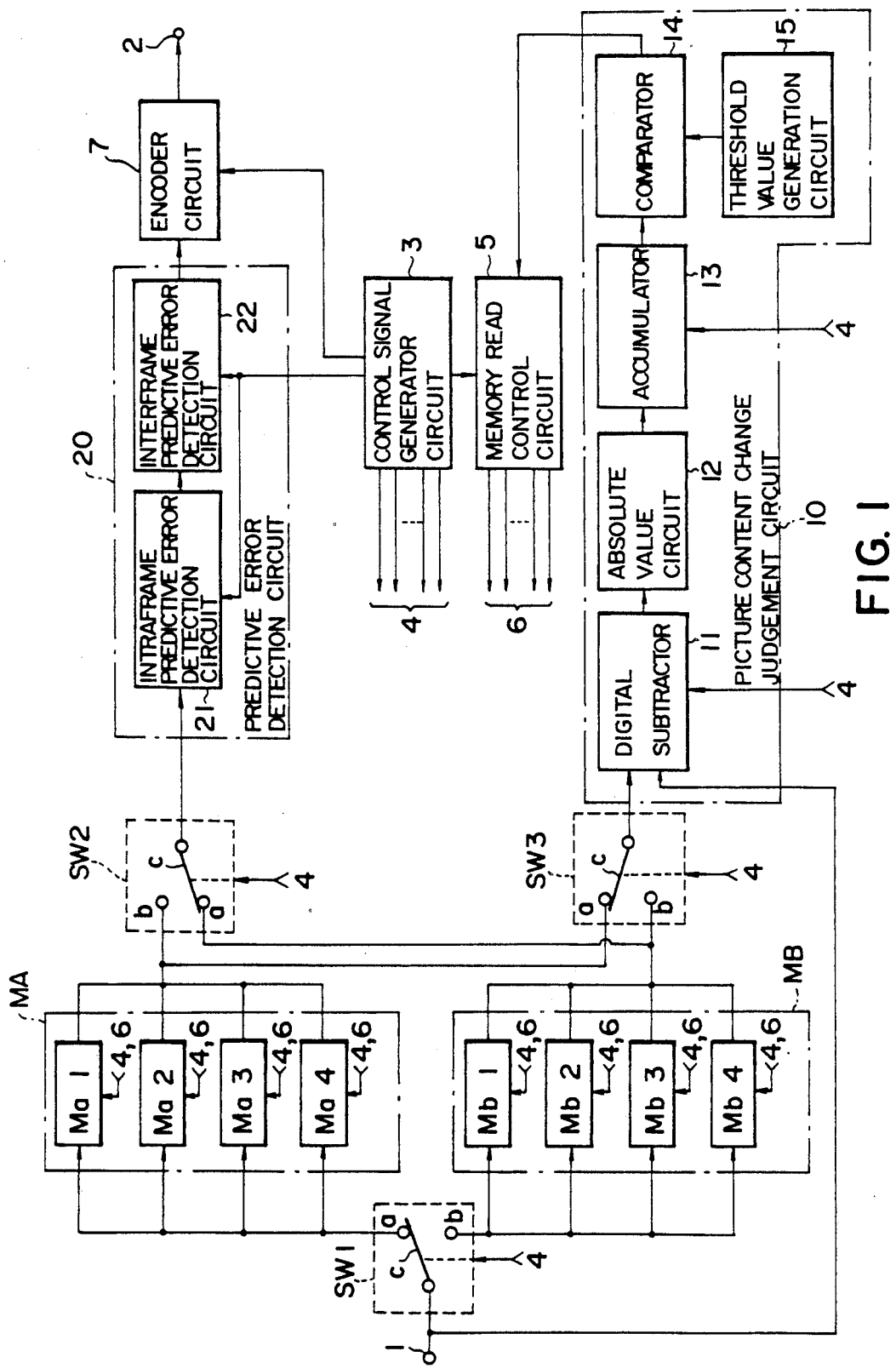
FIG. 1 is a block diagram showing the configuration of a coding system according to a first embodiment of this invention.

Preferred embodiments of this invention will now be described with reference to the attached drawings.

FIGS. 1 to 6 show basic configurations of coding systems according to the first to sixth embodiments of this invention, respectively.

Initially, the configuration of a coding system according to the first embodiment of this invention will be described in accordance with FIG. 1. The coding system of the first embodiment is provided between the input and output terminals 1 and 2, and includes a changeover switch SW1 of which movable contact c is connected to the terminal 1, memory units MA and MB having a plurality of memory elements labeled $Ma_1$ to $Ma_4$ and $Mb_1$ to $Mb_4$, respectively. This system further includes a control signal generator circuit 3 for sending switching control signals to the switches $SW_1$ to $SW_3$, and respective memory elements $Ma_1$ to $Ma_4$ and $Mb_1$ to $Mb_4$ through output lines 4, a memory read control circuit 5 for sending memory read control signals through output lines 6, an encoder circuit 7 connected between the terminal 2 and the control signal generator circuit 3, a circuit 10 for judging changes in the picture content connected between the terminal 1 and the control circuit 5, and a predictive error detection circuit 20 connected between the switch $SW_2$ and the encoder circuit 7.

More particularly, the judgement circuit 10 is composed of a digital subtracter 11 to which the terminal 1, the movable contact c of the switch $SW_3$ and the circuit 3 are respectively connected, an absolute value circuit 12 for receiving an output from the subtracter 11 to determine the absolute value thereof, an accumulator 13 for accumulating an output from the absolute value circuit 12 and a control signal from the generator circuit 3, a comparator 14 for comparing both outputs from the accumulator 13 and a threshold value generation circuit 15. Further, the predictive error detection circuit 20 is composed of an intraframe predictive error detection circuit 21 to which the movable contact c of the switch $SW_2$ is connected and to which a control signal from the generator circuit 3 is delivered, and an interframe predictive error detection circuit 22 to which an output from the detection circuit 21 and a control signal from the circuit 3 are delivered. It is to be noted that the encoder circuit 7 receives an output from the detection circuit 22 and also receives a control signal from the circuit 3.

The changeover switch $SW_1$ carries out the switching operation in cooperation with the changeover switch $SW_2$ and the changeover switch $SW_3$. The cooperative switching operation of the three changeover switches $SW_1$ to $SW_3$ is carried out in a manner so that respective movable contacts c of the changeover switches $SW_1$ to $SW_3$ are concurrently switched to the fixed contacts to which the same reference numerals are attached in the respective changeover switches $SW_1$ to $SW_3$.

The timing in which movable contacts c of respective changeover switches $SW_1$ to $SW_3$ are sequentially and interchangeably switched between two fixed contacts a, b is determined by a switching control signal having a predetermined period delivered from the control signal generator circuit 3 through the signal lines 4. The period of the switching control signal corresponds to the length of a moving picture signal to be stored into all of plural memories $Ma_1$, $Ma_2$, ... in the memory unit MA to be described later (which is the same length as that of a moving picture signal to be stored into all the plural memories $Mb_1$, $Mb_2$, ... in the storage unit MB).

When it is assumed that the number of memories $Ma_1$, $Ma_2$ ... used for constructing the memory unit MA and the number of memories $Mb_1$, $Mb_2$ ... used for constructing the memory unit MB are equal to N, respectively (N=4 in the first embodiment shown in FIG. 1), and the length of a moving picture signal to be stored in sequence into each of the memories $Ma_1$, $Ma_2$ ..., $Mb_1$, $Mb_2$ ... is assumed to be the same as that of a picture signal corresponding to each frame in the moving pictorial image, the period of the switching control signal is an N frame period (4 frame period in the first embodiment shown in FIG. 1).

It is to be noted that a moving picture signal to be stored in sequence into the respective memories $Ma_1$, $Ma_2$..., $Mb_1$, $Mb_2$... in the memory units MA and MB may have a length of the picture signal corresponding to the field period in a moving picture signal (picture signal for one field period), and it is needless to say that the period of the switching control signal in this case is an N field period.

In FIG. 1, the period of the switching control signal is assumed to be a four frame period. Thus, moving picture signals delivered in sequence on the time base to the input terminal 1 are such that moving picture signals of four successive frames are delivered to the memory unit MA so that moving picture signals of one frame period can be stored in sequence into the respective memories $Ma_1$, $Ma_2$... in the memory unit MA for four frame period during which the movable contact c of the changeover switch $SW_1$ is switched to the fixed contact a side, and such that moving picture signals of four frame period successive on the time base are delivered to the memory unit MB so that moving picture signals of one frame can be stored in sequence into the respective memories $Mb_1$, $Mb_2$, ... in the memory unit MB for four frame period during which the movable contact c of the changeover switch $SW_1$ is switched to the fixed contact b side.

To the respective memories $Ma_1$ to $Ma_4$, $Mb_1$ to $Mb_4$ ... in the two memory units MA, MB to which moving picture signals of four frames are sequentially and interchangeably on the time base as stated above, a write control signal and a read control signal are delivered at predetermined timings from the control signal generator circuit 3 and the memory read control circuit 5, respectively. For a time period during which moving picture signals of four frame period are delivered to the memory unit MA, moving picture signals of one frame period are stored in sequence into the respective memories $Ma_1$ to $Ma_4$ in the memory unit MA. On the other hand, for a time period during which moving picture signals of the four frame period are delivered to the memory unit MB, moving picture signals of one frame period are stored in sequence into the respective memories $Mb_1$ to $Mb_4$ in the memory unit MB. The read operation from the respective memories $Ma_1$ to $Ma_4$, $Mb_1$ to $Mb_4$ ... in the two memory units MA and MB is performed in a manner described later by read control signals sent from the memory read control circuit 5 at predetermined timings, respectively.

Each moving picture signal output through the movable contact c of the changeover switch $SW_2$ is delivered to the predictive error detection circuit 20 in the first embodiment shown in FIG. 1.

The operation of the first embodiment is carried out as follows. As shown in FIG. 1, the predictive error detection circuit 20 generates an intraframe or interframe predictive error detection signal corresponding to a moving picture signal delivered from the memory unit MA or MB through the movable contact c of the changeover switch $SW_2$ to encode the predictive error signal thus generated and to send it to the output terminal 2. The predictive error detection circuit 20 and the encoder circuit 7 perform predetermined operations, i.e., a predictive error generation operation or a predetermined coding operation by required control signals delivered from the control signal generator circuit 3, respectively. Every time two memory units MA and MB are switched, the predictive error detection circuit is initialized into a predetermined state.

As the predictive error detection circuit 20 and the code transform circuit 7, circuits of any structure may be used. For example, as the predictive error detection circuit 20, as shown in FIG. 1, there may be used a predictive error detection circuit 20 constructed to first output an intraframe predictive error of a moving picture signal determined every frame by the intraframe predictive error detection circuit 21 for determining an intraframe predictive error every frame of an input moving picture signal thereafter to output an interframe predictive error determined by the interframe predictive error detection circuit 22.

The judgement circuit 10 is constructed to to detect an amount of change of a picture content between adjacent frames on the time base in a group of frames (it has been already described that each group has four frames), and to determine whether or not the amount of change of the picture content is above a predetermined value, thus to deliver the judgement result to the memory read control circuit 5.

The judgement circuit 10 is composed of a digital subtracter 11, an absolute value circuit 12, an accumulator 13, a comparator 14, and a threshold value generator circuit 15. The digital subtracter 11 computes a difference between picture signals of frames adjacent each other.

This computation may be performed with respect to all picture signals of frames, or may be performed with respect to corresponding discrete picture signals in picture signals of frames.

An output signal from the digital subtracter 11 is changed to an absolute value in the absolute value circuit 12. The absolute value is delivered to the accumulator 13. The accumulator 13 computes a total sum of the absolute values throughout a complete frame. The accumulator 13 delivers, to the comparator 14, the computed result of the total sum of the absolute values. Thereafter, the accumulator 13 is reset by a reset signal delivered from the control signal generator circuit 3.

The comparator 14 compares the computed result of the total sum of the absolute values with a threshold value delivered from the threshold value generator circuit (threshold value setting circuit) 15 to deliver a signal indicative of the compared result to the memory read control circuit 5. When there occurs a great change in picture contents between successive frames, the total sum of the absolute values is above the threshold value, then the judged result is output from the comparator 14.

The predictive error detecting operation carried out in the predictive error detection circuits 20 in FIG. 1 is performed with respect to picture signals obtained by partitioning picture signals corresponding to successive pictures into picture signals with every frame group comprised of a predetermined number of frames. In the efficient coding system for a moving picture signal shown in FIG. 1, the predictive error detecting operation carried out in the predictive error detection circuit 20 is performed by using picture signals corresponding to a group of frames having a predetermined number of frames N (it has been already described that N is equal to 4 in the embodiment of FIG. 1) delivered from the memory unit MA or the memory unit MB through the movable contact c of the changeover switch $SW_2$ as previously described.

It can be readily understood that where the picture content is rapidly and greatly changed by scene change, fade-in or fade-out rapidly carried out, or other operations in frames of a moving pictorial image corresponding to moving picture signals which correspond to a group of frames divided into picture signals every frame group each comprised of a predetermined number N of frames, the level distribution of predictive errors in time obtained by the predictive error detecting operation will greatly differ from the level distribution of predictive errors in base time base obtained by making a predictive error detection of moving picture signals corresponding to an ordinary moving pictorial image.

Figure 7A:
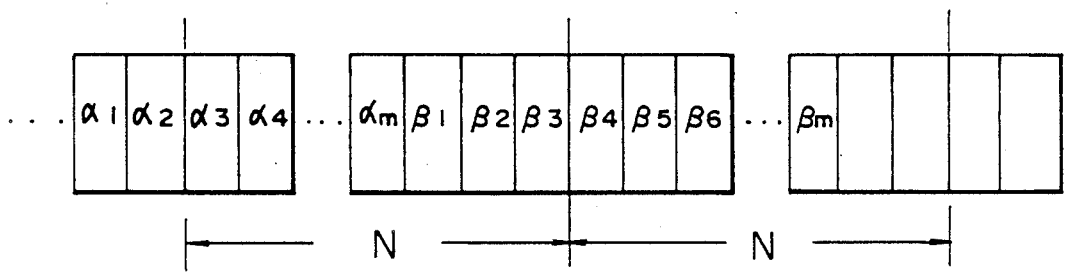
FIGS. 7 to 9 are signal arrangement diagrams for explaining the operation of a coding system according to this invention, respectively.
Figure 8A:
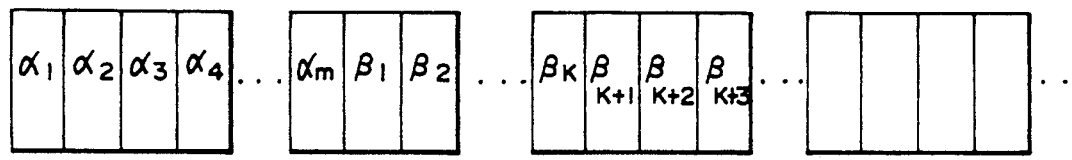

FIG. 7(a) and FIG. 8(a) are diagrams showing the case where the picture content is rapidly and greatly changed, e.g., by scene change, fade-in or fade-out, or other operations.

In FIGS. 7 to 9, N is the number of frames of one group, $\alpha$ is a symbol for indicating that a moving picture signal is one in a certain scene, $\beta$ is a symbol for indicating that a moving picture signal is one in a scene different from the scene $\alpha$ and suffixes attached to the symbols $\alpha$ and $\beta$ are numbers of frames in the moving picture signal in respective scenes.

Figure 9A:
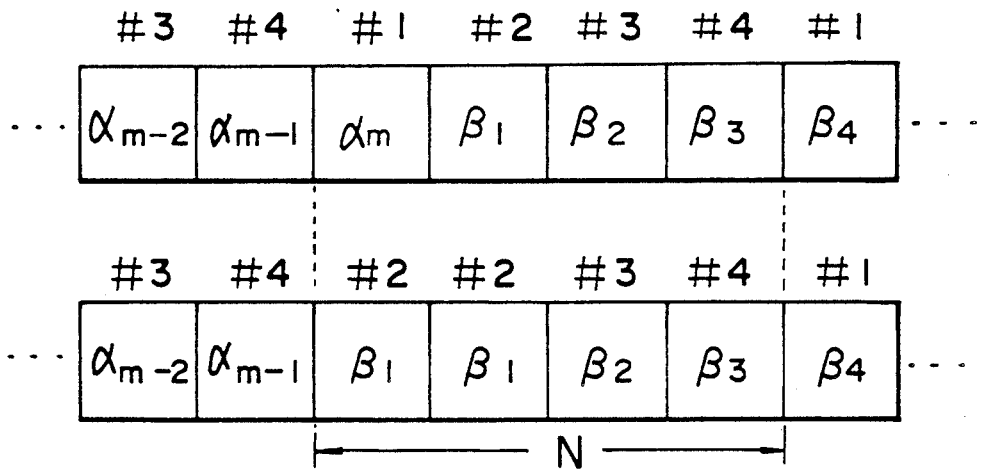

FIG. 7(a) and FIG. 9(a) illustrate that the picture content is rapidly and greatly changed by scene change, fade-in or fade-out rapidly carried out, or other operations in frames which corresponds to one group of frames partitioned into every frame group comprised of a predetermined number N of frames. As illustrated in FIG. 7(a), where two scenes are included in one group of frames each comprised of N successive frames subject to the predictive error detection, the level distribution of predictive errors in base time base will greatly differ from the level distribution of predictive errors corresponding to an ordinary moving picture. As a result, failure to realize efficient coding or deterioration in picture quality would result.

Figure 7B:
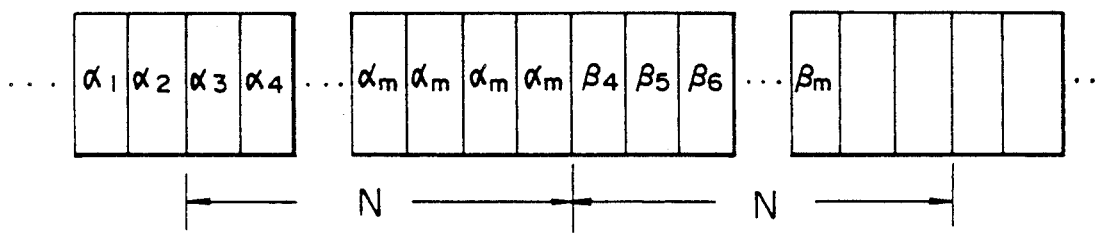

FIGS. 7(b) and (c) illustrate that where moving picture signals $\alpha_3$ to $\alpha_m$ and $\beta_1$ to $\beta_3$ in two scenes are included in picture signals of one group of frames as illustrated in FIG. 7(a), a picture signal of one group of frames is unified into the picture signal in either scene.

Figure 7C:
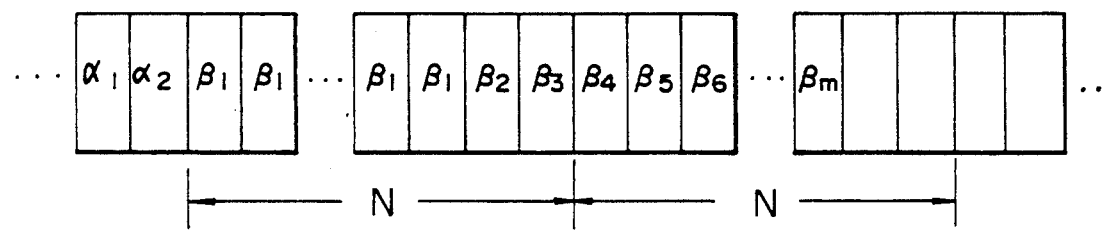

FIG. 7(b) shows that where moving picture signals $\alpha_3$ to $\alpha_m$ and $\beta_1$ to $\beta_3$ in two scenes are included in a picture signal of one group of frames comprised of N successive frames subject to the predictive error detection, the moving picture signals $\beta_1$ to $\beta_3$ in one scene is replaced with a moving picture signal $\alpha_m$ of the last frame of a moving picture signal in a scene where no scene change has been yet occured subject to the predictive error detection so that they are in correspondence with moving picture signals in one scene such as moving picture signals $\alpha_3$, $\alpha_4$, $\alpha_m$, $\alpha_m$, $\alpha_m$, $\alpha_m$. Further, FIG. 7(c) shows that where moving picture signals $\alpha_3$ to $\alpha_m$, $\beta_1$ to $\beta_3$ in one scene are included in picture signals of a group of frames as illustrated in FIG. 7(a), moving picture signals $\alpha_3$ to $\alpha_m$ in one scene are replaced with a moving picture signal $\beta_1$ of the first frame of a moving picture signal in a scene in which scene change has been already conducted so that they are in correspondence with moving picture signals such as moving picture signals $\beta_1$, $\beta_1$, $\beta_1$, $\beta_1$, $\beta_2$, $\beta_3$.

Figure 8B:
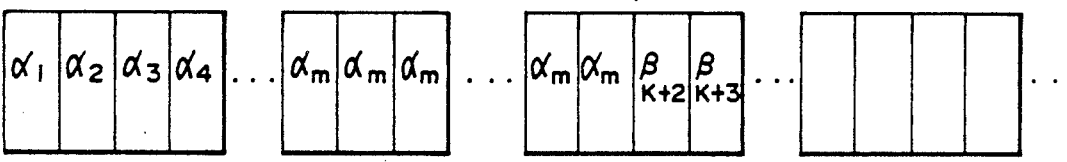
Figure 8C:
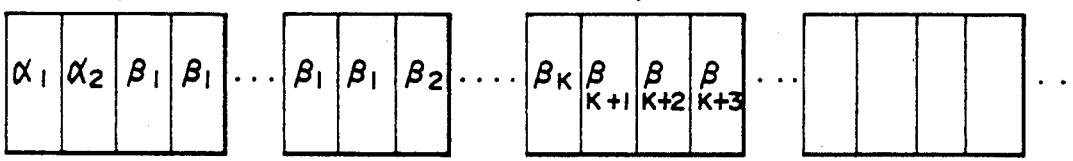

FIGS. 8(b) and (c) show other examples. Where moving picture signals $\alpha_3$ to $\alpha_m$, $\beta_1$ to $\beta_{k+1}$ in two scenes are included in picture signals of a group of frames as illustrated in FIG. 8(a), an approach is employed to unify picture signals of a group of frames comprised of N successive frames subject to the predictive error detection at the predictive error detection so that they are in correspondence with picture signals in either scene. In this case, the following assumption is made: a frame $\alpha_m$ preceding in time two successive frames which have caused scene change is a first frame; the other frame $\beta_1$ in the above two pictures is a second frame; the number of pictures from the leading frame of a group of frames to the first frame $\alpha_m$ is A; the state where the second frame and all other frames successive thereto in a group of frames are replaced with the first frame $\alpha_m$ is a first frame replacement state; and the state where all frames from the leading frame of a group of frames to the first frame $\alpha_m$ is replaced with the second frame $\beta_1$ is a second frame replacement state. Under such assumption, where the relationship between the number of frames A from the leading frame of the group of frames to the first frame and the number of frames B from the second frame to the last frame of the group of frames is expressed as A<B, a procedure is taken such that the second frame replacement state results as shown in FIG. 8(c). Further, when such a relationship is expressed as A≧B, a procedure is taken such that the first frame replacement state results as shown in FIG. 8(b). Furthermore, when such a relationship is expressed as A<B, a procedure is taken such that the second frame replacement state results as shown in FIG. 8(c). In addition, when such a relationship is expressed as A≧B, a procedure is taken such that the first frame replacement state results as shown in FIG. 8(b). Namely, where the numbers of frames to be replaced are different from each other with respect to the picture signals in two scenes, such a replacement is made to select picture signals in a scene having less number of pictures to be replaced. On the other hand, where the numbers of pictures to be replaced are the same with respect to the picture signals in two scenes, such a replacement is made to select picture signals in an arbitrary scene. Thus, even if replacement of picture signals is made as stated above, an improvement is made such that an unnatural movement in the moving pictorial image does not occur.

In the efficient coding system for a moving picture signal according to this invention, replacement of picture signals as has been described with reference to FIGS. 7(b) and (c), and FIGS. 8(b) and (c) can be carried out by setting read timings from memories $Ma_1$, $Ma_2$..., $Mb_1$, $Mb_2$... in the memory units MA and MB.

The diagrams depicted as square frames at upper portions of FIGS. 9(a), (b) and (c) are views for explaining the write state of picture signals into memories $Ma_1$, $Ma_2$..., $Mb_1$, $Mb_2$... in the memory units MA, MB, respectively. Further, the diagrams depicted as square frames at lower portions of FIGS. 9(a), (b) and (c) are views for explaining the read state of picture signals from memories $Ma_1$, $Ma_2$..., $Mb_1$, $Mb_2$... in the memory units MA, MB, respectively.

It is to be noted that the square frames shown in FIG. 9 represent either of the memory units MA, MB in FIG. 1 in a model form.

Further, #1, #2, #3, #4 in FIG. 9 represent memories to which the same numerals as the suffixes 1, 2, 3, 4 in respective memories $Ma_1$, $Ma_2$, $Ma_3$, $Ma_4$ ($Mb_1$, $Mb_2$, $Mb_3$, $Mb_4$) shown in FIG. 1 are attached. In addition, characters and numerals described in the squares indicating respective memories represent signals of a sequential frame period of moving picture signals successive on the time base.

In the two memory units MA, MB shown in FIG. 1, moving picture signals sequentially delivered in time to the input terminal 1 is stored as follows. For a four frame period during which the movable contact c of the changeover switch SW is switched to the fixed contact a side, moving picture signals of one frame period are sequentially stored into respective memories $Ma_1$, $Ma_2$... in the memory unit MA. On the other hand, for a four frame period during which the movable contact c of the changeover switch SW is switched to the fixed contact b side, moving picture signals of one frame period are sequentially stored into respective memories $Mb_1$, $Mb_2$... in the memory unit MB. In a manner stored above, moving picture signals of a four frame period are sequentially and interchangeably on the time base into respective memories $Ma_1$ to $Ma_4$, $Mb_1$ to $Mb_4$ in the two memory units MA, MB.

Figure 9B:
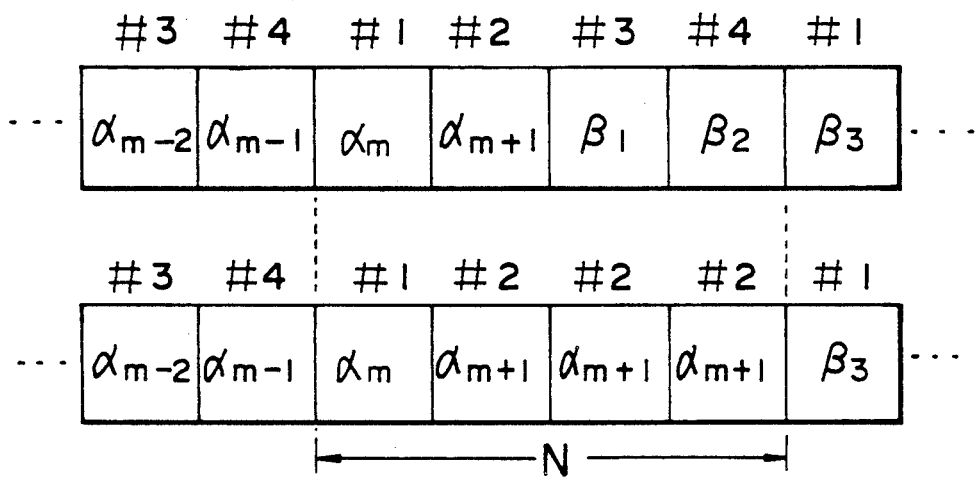
Figure 9C:
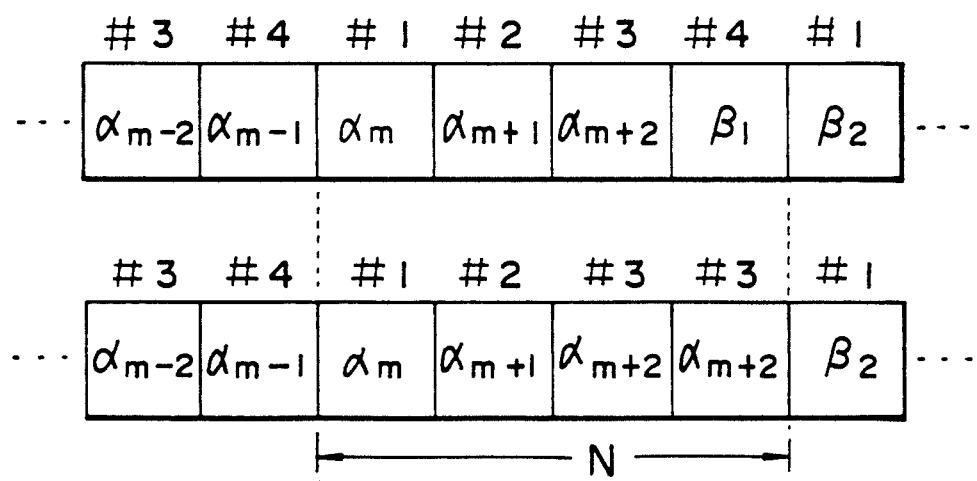

It is illustrated in FIG. 9(a) that moving picture signals stored into respective memories $Ma_1$ to $Ma_4$ ($Mb_1$ to $Mb_4$) in the memory unit MA (MB) as stated are stored into N memories (four memories in the embodiment) #1, #2, #3, #4 indicated by square frames at the upper portion of FIG. 9(a) in order of $\alpha_m$, $\beta_1$, $\beta_2$ and $\beta_3$. Further, it is illustrated in FIG. 9(b) that such moving picture signals are stored into N memories (four memories in the first embodiment) indicated by the square frames at the upper portion of FIG. 9(b) in order of $\alpha_m$, $\alpha_{m+1}$, $\beta_1$ and $\beta_2$. In addition, it is illustrated in FIG. 9(c) that such moving picture signals are stored into N memories (four memories in the first embodiment) indicated by the square frames at the upper portion of FIG. 9(c) in order of $\alpha_m$, $\alpha_{m+1}$, $\alpha_{m+2}$ and $\beta_1$.

Two memories MA, MB shown in FIG. 1 are provided such that while one memory unit operates store or memory mode, the other memory operates in a read mode as previously described. The technique to read picture signals from the memory units in a read mode when moving picture signals in two scenes are stored in N memories in the memory units as illustrated in FIGS. 9(a) to (c) where the manner to store moving pictures into N memories in the memory unit is illustrated differs from each other, as illustrated by the square frames shown at the respective lower portions of FIGS. 9(a) to (c). This is because the read operation is controlled by read control signals sent at respective predetermined timings from the memory read control circuit 5.

Namely, where moving picture signals stored in respective memories $Ma_1$ to $Ma_4$ ($Mb_1$ to $Mb_4$) in the memory unit MA (MB) as stated above have a memory content such that they are stored into N memories (four memories in the first embodiment) #1, #2, #3 and #4 in order of $\alpha_m$, $\beta_1$, $\beta_2$ and $\beta_3$, for one frame period from the time when moving picture signal $\beta_1$ begins being applied to the input terminal 1, a signal indicative of the judged result that an amount of change of the picture content between adjacent two pictures exceeds a predetermined value by the operation for judging an amount of change of the picture content between moving picture signals $\alpha_m$ and $\beta_1$ which has been carried out by the judgement circuit 10 is delivered to the memory read control circuit 5.

The control circuit 5 identifies, by the signal indicative of judged result, which portion of N successive frames is caused to correspond to the signal indicative of a judged result to deliver a read control signal to N memories of the memory unit through the line 6 in accordance with a pattern indicative of a read sequence of moving picture signals from N memories of the memory unit determined in advance in correspondence with the above identifying operation.

The read operation from the memories of the memory unit illustrated in FIG. 9(a) is carried out in order of #2, #2, #3 and #4 with respect to N memories (four memories in the first embodiment) indicated by square frames at the lower portion of FIG. 9(a). Thus, moving picture signals are delivered serially on the time base to the predictive error detection circuit 11 in order of $\beta_1$, $\beta_1$, $\beta_2$ and $\beta_3$.

Further, where moving picture signals stored into respective memories $Ma_1$ to $Ma_4$ ($Mb_1$ to $Mb_4$) in the memory unit MA (MB) as described above have a memory content such that they are stored into N memories (four memories in the first embodiment) #1, #2, #3 and #4 indicated by the square frames at the upper portion of FIG. 9(b) in order of $\alpha_m$, $\alpha_{m+1}$, $\beta_1$ and $\beta_2$, for one frame period from the time when the moving picture signal $\beta_1$ begins being inputted to the input terminal 1, a signal indicative of the judged result that an amount of change of the picture content between the adjacent two pictures exceeds a predetermined value by the operation for judging the amount of change of the picture content between the moving picture signals $\alpha_{m+1}$ and $\beta_1$ carried out by the change quantity judgement circuit 10 is delivered to the memory read control circuit 5.

The memory read control circuit 5 identifies, by the signal indicative of the judged result, which portion of N successive frames is caused to correspond to the signal indicative of the judged result to deliver a read control signal to the N memories of the memory unit through the line 6 in accordance with a pattern of the read sequence of moving picture signals from the N memories of the memory unit determined in advance in correspondence with the above identifying operation.

The read operation from the memories of the memory unit illustrated in FIG. 9(b) is carried out in order of #1, #2, #2 and #2 with respect to N memories (four memories in the first embodiment) indicated by the square frames at the lower portion of FIG. 9(b). Thus, moving picture signals are delivered serially on the time base to the predictive error detection circuit 20 in order of $a_m$, $a_{m+1}$, $a_{m+1}$ and $a_{m+1}$.

Further, where moving picture signals stored into respective memories Ma$_1$ to Ma$_4$ (Mb$_1$ to Mb$_4$) of the memory unit MA (MB) have a memory content such that they are stored into the N memories (four memories in the first embodiment) indicated by square frames at the upper portion of FIG. 9(c) #1, #2, #3 and #4 in order of $a_m$, $a_{m+1}$, $a_{m+2}$ and $\beta_1$, for one frame period from the time when the moving picture signal $\beta_1$ begins being applied to the input terminal 1, a signal indicative of the judged result that an amount of change of the picture content between adjacent two frames exceeds above a predetermined quantity by the operation for judging an amount of change of the picture content between the moving picture signals $a_{m+2}$ and $\beta_1$ delivered to the memory read control 5.

The memory read control circuit 5 identifies, by the judgment signal, which portion of N successive frames is caused to correspond to the judgment signal. Thus, a read control signal is delivered to a predetermined one of N memories of the memory unit through the line 6 in accordance with a pattern of the read sequence of moving picture signals from N memories of the memory unit determined in advance in correspondence with the above identifying operation.

The read operation from the memories illustrated in FIG. 9(c) is carried out in order of #1, #2, #3 and #3 with respect to N memories (four memories in the first embodiment) indicated by the square frames at the lower portion of FIG. 9(c). Thus, moving picture signals are delivered serially on the time base to the predictive error detection circuit 20 in order of $a_m$, $a_{m+1}$, $a_{m+2}$, and $a_{m+2}$.

If it is possible to identify which portion of N successive pictures is caused to correspond to the judgment signal as stated above, even in the case where replacement of pictures as shown in FIGS. 8(b) and (c) previously described is carried out, the pattern for replacing pictures can be determined in advance. Namely, the judgment circuit 10 and the control circuit 5 may be constructed as follows. Where the judgment signal indicating that a change of the picture content between adjacent two pictures is great occurs in the judgment circuit 10, the judgment circuit 10 delivers the judgment signal as an address signal to the memory read control circuit 5, and the control circuit 5 outputs a read control signal using a Table to a memory element to be read out of the memory unit on the basis of the above-mentioned address signal.

It is to be noted that this invention is not limited to the first embodiment which has been described with reference to FIGS. 1, 7(a) to (c), 8(a) to (c), and 9(a) to (c), but may be constructed as in the second to sixth embodiments shown in FIGS. 2 to 6. In the latter arrangement, the same objects and advantages as those of the first embodiment can be obtained. It is to be noted that the components designated by the same reference numerals as those in FIG. 1 represent elements identical or equivalent to those of the first embodiments.

Figure 2:
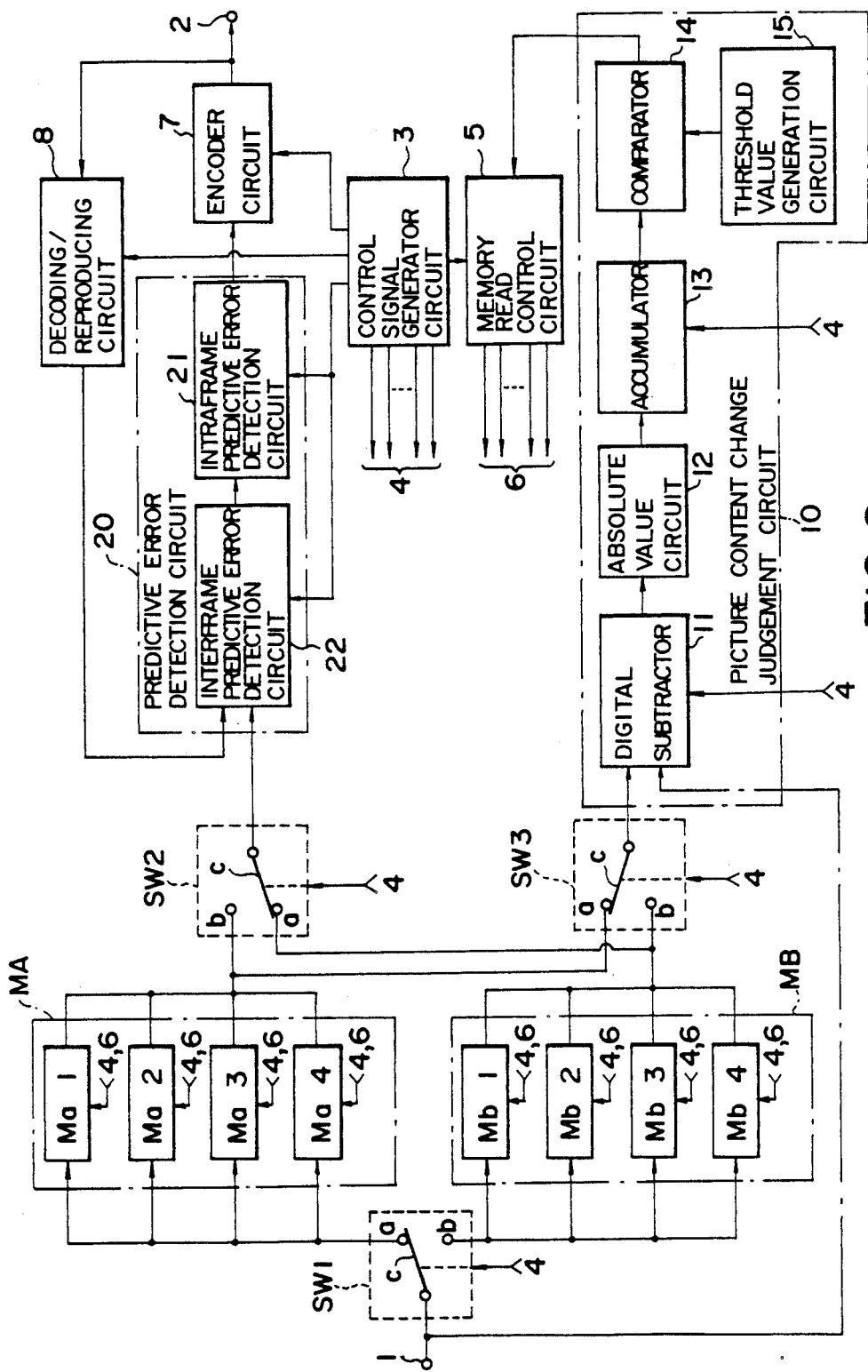
FIG. 2 is a block diagram showing the configuration of a coding system according to a second embodiment of this invention.

As shown in FIG. 2, a coding system according to the second embodiment of this invention includes a decoding/reproducing circuit 8 for decoding an output from the encoder circuit 7 for a second time on the basis of a control signal from the control signal generator circuit 3 to feed it back to a predictive error detection circuit 20A in addition to the configuration of the coding system according to the first embodiment. As a result of the fact that the decoding/reproducing circuit 8 is provided, the detection circuit 20A of the coding system according to the second embodiment is composed of an interframe predictive error detection circuit 22 for detecting an interframe predictive error between a signal reproduced by the reproducing circuit 8 and a moving picture signal of a new frame, and an intraframe predictive error detection circuit 21 for detecting an intraframe predictive error on the basis of the interframe predictive error obtained by the detection circuit 22 to send it to the encoder circuit 7.

Since the operation of the coding system according to the second embodiment is the same as the operation of the above-described first embodiment, its repetitive explanation will be omitted. It is to be noted that the system of the second embodiment operates on the assumption that the section which has been described as the predictive error detection circuit 20 in the description of the operation of the first embodiment corresponds to the predictive error detection circuit 20A. To the interframe predictive error detection circuit 22 of the detection circuit 20A, a moving picture signal outputted through the movable contact of the changeover switch SW$_2$ is delivered in addition to a signal from the reproducing circuit 8.

Figure 3:
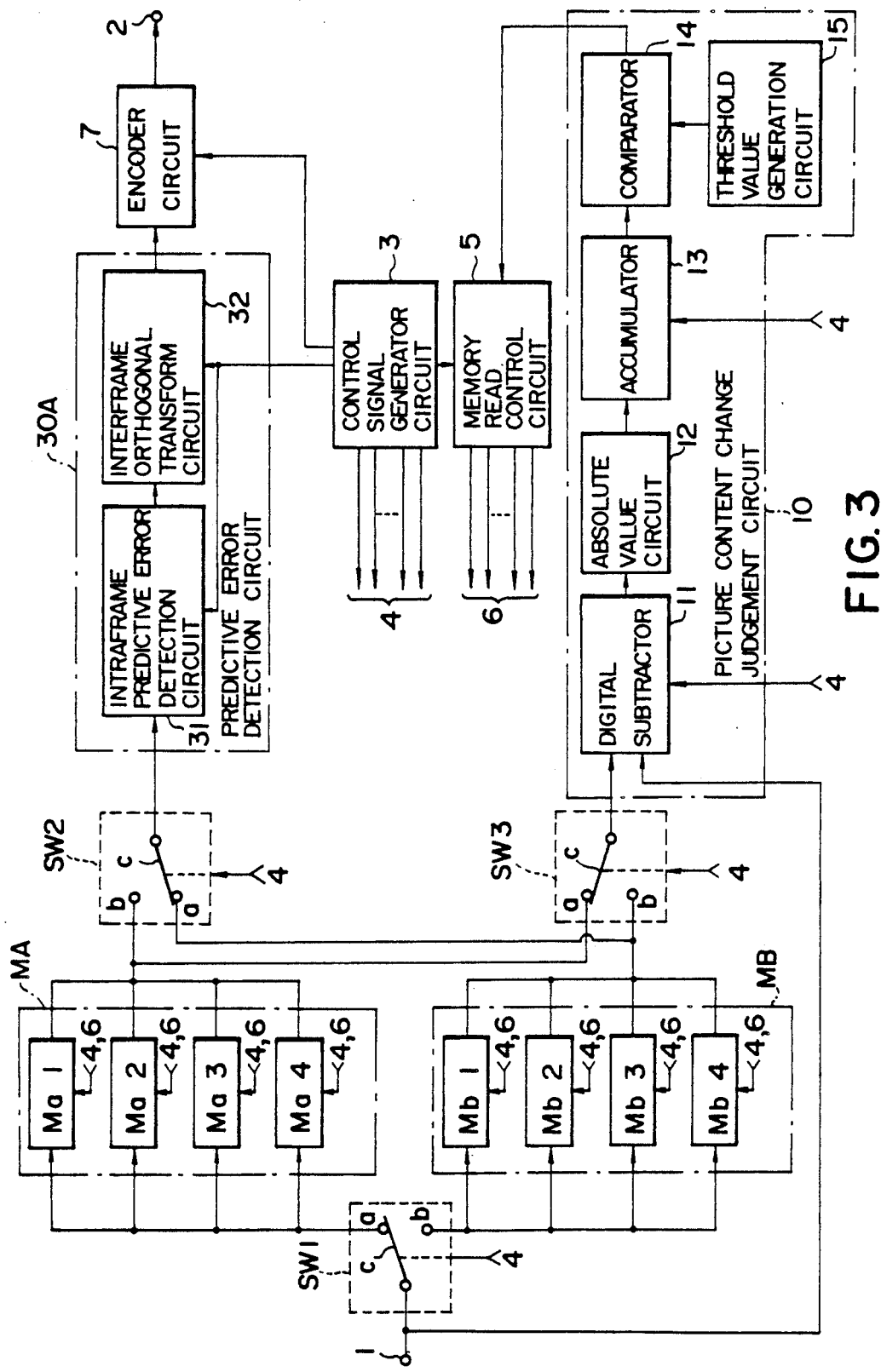
FIG. 3 is a block diagram showing the configuration of a coding system according to a third embodiment of this invention.

A coding system according to the third embodiment of this invention is shown in FIG. 3. Also in this embodiment, there is provided a picture content change judgment circuit 10 for detecting an amount of change of the picture content between adjacent frames in moving picture signals delivered to the input terminal 1 to output a judgment signal when the amount of change exceeds above a predetermined value. When the judgment signal from the judgment circuit 10 is delivered to a memory read control circuit 5, this control circuit 5 identifies which portion of N successive is caused to correspond to the judgment signal to deliver a read control signal to a predetermined one of N memories of the memory unit through the line 6 in accordance with a pattern of a read sequence of moving picture signals from N memories of the memory unit determined in advance in correspondence with the above identifying operation. Thus, read operation from the memories of the memory unit is carried out. The moving picture signal read from the memories is delivered to an intraframe predictive error detection circuit 31. The intraframe predictive error detection circuit 31 detects an intraframe predictive error in the successive frames to deliver it to an interframe orthogonal transform circuit 32. This interframe orthogonal transform circuit 32 generates an interframe orthogonal transform coefficient to deliver it to the encoder circuit 7. Thus, an efficient compressed picture data is sent to the output terminal 2. It is to be noted that circuits of any structure may be used as the orthogonal transform circuit. A predictive error detection circuit 30A is composed of the intraframe predictive error detection circuit 31 and an interframe orthogonal transform circuit 32. In addition, a moving picture signal outputted through the movable contact c of the changeover switch $SW_2$ in the embodiment shown in FIG. 3 is delivered to the intraframe predictive error detection circuit 31.

Figure 4:
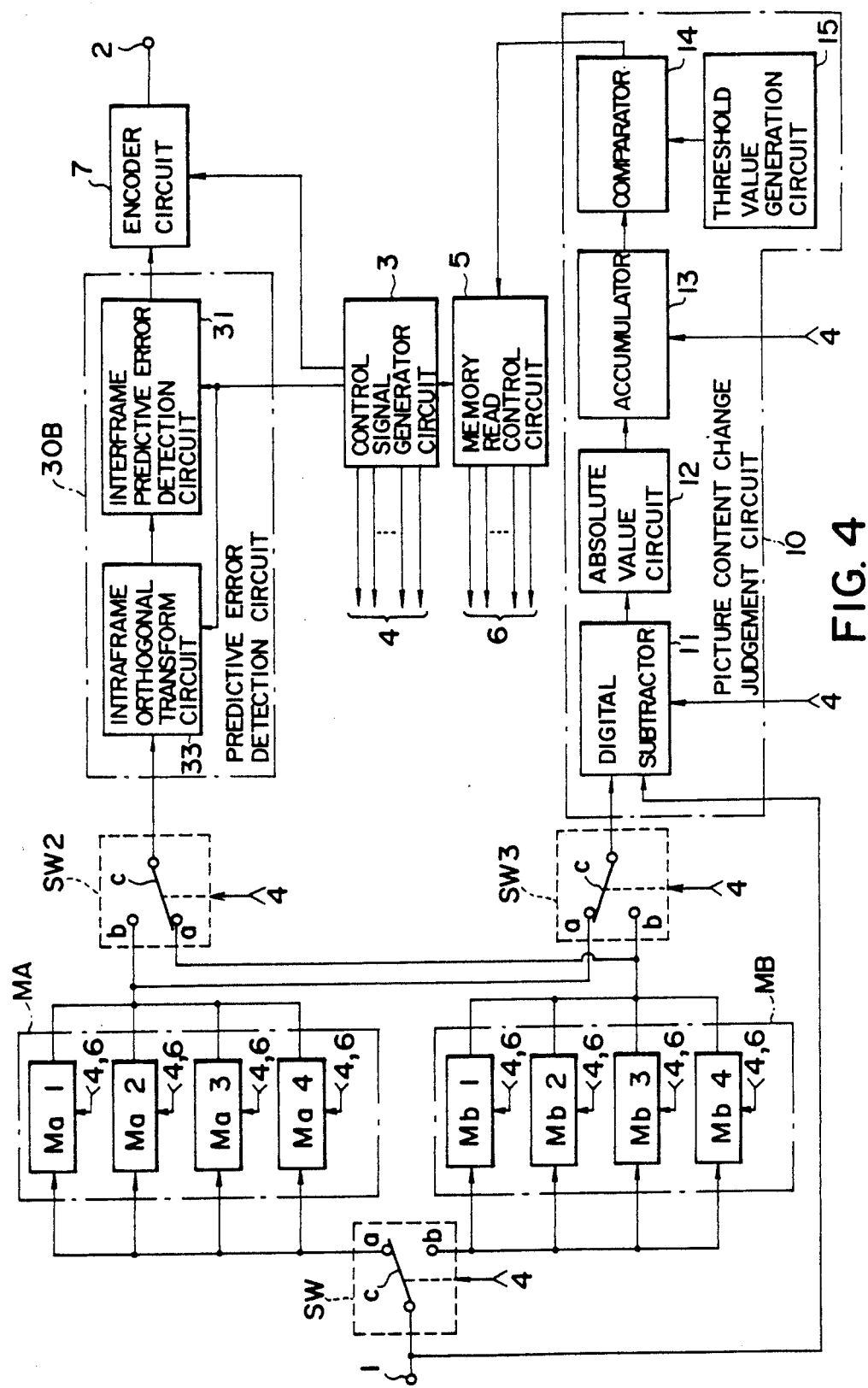
FIG. 4 is a block diagram showing the configuration of a coding system according to a fourth embodiment of this invention.

A coding system according to the fourth embodiment shown in FIG. 4 includes a predictive error detection circuit 30B composed of an intraframe orthogonal transform circuit 33 for generating an intraframe orthogonal transform coefficient on the basis of a moving picture signal delivered through the movable contact c of the switch $SW_2$, and an interframe predictive error detection circuit 34 for detecting an interframe predictive error on the basis of the orthogonal transform coefficient.

The operation of the fourth embodiment will be described. A picture content change judgment circuit 10 detects an amount of change of the picture content between adjacent frames in moving picture signals delivered to the input terminal 1 to output a judgment signal when the amount of change exceeds above a predetermined value. When the judgment signal from the picture content change quantity judgment circuit 10 is delivered to the memory read control circuit 5, the memory read control circuit 5 identifies which portion of N pictures successive on the time base is caused to correspond to the judgment signal to deliver a read control signal to a predetermined one of N memories of the memory unit through the line 6 in accordance with a pattern of a read sequence of moving picture signals N memories of the memory unit determined in advance in correspondence with the above identifying operation. Thus, a read operation from the memory is carried out. A moving picture signal read from the memory is delivered to the intraframe orthogonal transform circuit 33. The intraframe orthogonal transform circuit 33 generates an intraframe orthogonal transform coefficient to deliver the orthogonal transform coefficient to an interframe predictive error detection circuit 34 to detect an interframe predictive error. The interframe predictive error detected by the interframe predictive error detection circuit 34 is delivered to the encoder circuit 7. Thus, an efficient compressed picture data is sent to the output terminal 2.

Figure 5:
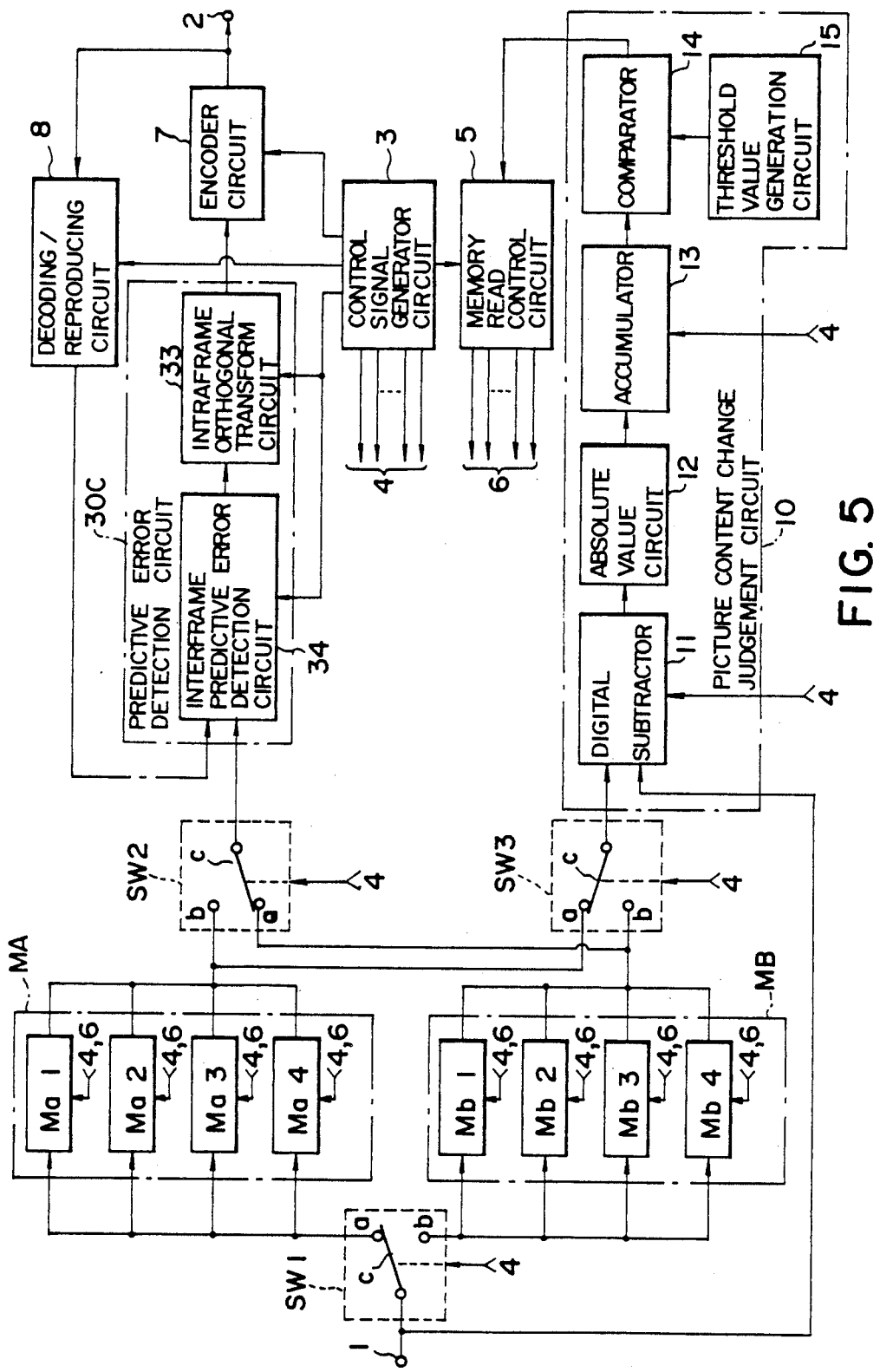
FIG. 5 is a block diagram showing the configuration of a coding system according to a fifth embodiment of this invention.

A coding system according to the fifth embodiment shown in FIG. 5 includes a decoding/reproducing circuit 8 for generating a decoded reproduced signal by a control signal from the control signal generator circuit 3 on the basis of an output from the encoder circuit 7, and a predictive error detection circuit 30C. This detection circuit 30C is composed of an interframe predictive error detection circuit 34 for detecting an interframe predictive error on the basis of a moving picture signal from the memory unit MA or MB through the movable contact c of the changeover switch $SW_2$ and a decoded signal from the reproducing circuit 8, and an intraframe orthogonal transform circuit 33 for generating an intraframe orthogonal transform coefficient on the basis of an output from the detection circuit 34.

The operation of the fifth embodiment will now be described. A picture content change quantity judgment circuit 10 detects a change quantity of the picture content between frames adjacent in a moving picture signal delivered to the input terminal 1 to output judgment signals when the change quantity exceeds above a predetermined value. When the judgment signal from the judgment circuit 10 is delivered to the memory read control circuit 5, this memory read control circuit 5 identifies which portion of N frames successive on the time base is caused to correspond to the judgment signal to deliver a read control signal to a predetermined one of N memories of the memory unit in accordance with a read sequence of moving picture signals from the N memories of the memory unit determined in advance in correspondence with the above identification. Thus, a read operation from the memories concerned of the memory unit is carried out. The moving picture signal which has been read out from the memory unit is delivered to the interframe predictive error detection circuit 34. Thus, the interframe predictive error detection circuit 34 detects an interframe predictive error to deliver it to the interframe orthogonal transform circuit 33. Thus, intraframe orthogonal transform circuit 33 generates an intraframe orthogonal transform coefficient to deliver it to the encoder circuit 7, thus to send efficiently compressed picture data to the output terminal 2 and to deliver it to the decoding/reproducing circuit 8. The moving picture signal decoded and reproduced by the decoding/reproducing circuit 8 is delivered to the interframe predictive error detection circuit 34.

Figure 6:
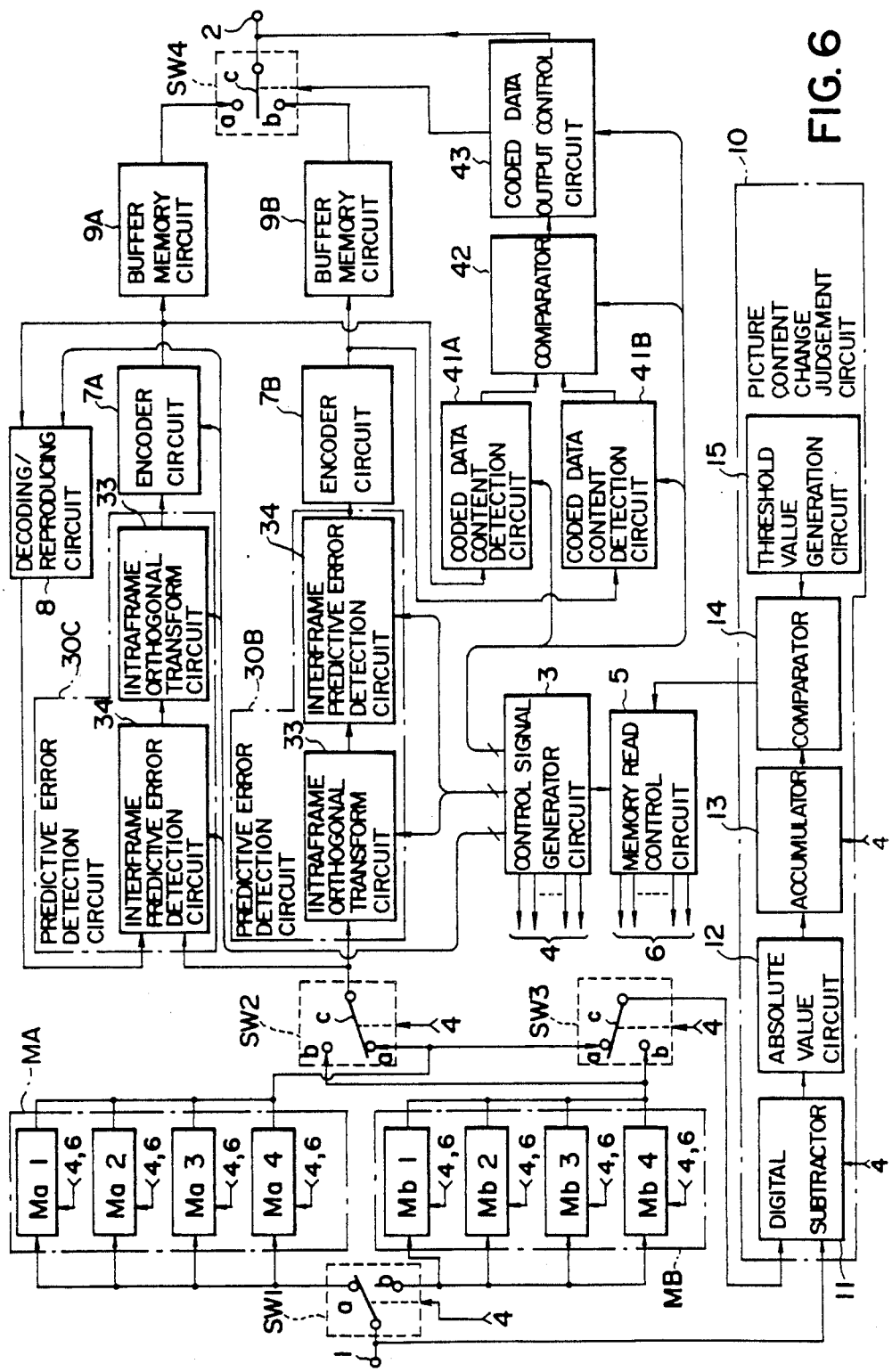
FIG. 6 is a block diagram showing the configuration of a coding system according to a sixth embodiment of this invention.

The sixth embodiment shown in FIG. 6 is based on combination of the predictive error detection circuit 30B and the predictive error detection circuit 30C provided with coding/decoding circuit 8 which are main components of the coding systems according to the fourth and fifth embodiments, respectively. The coding system of this embodiment includes a first encoder circuit 7A for encoding an output from the first predictive error detection circuit 30C, a second encoder circuit 7B for encoding an output from the second predictive error detection circuit 30B, buffer memory circuits 9A and 9B for temporarily storing outputs from the encoder circuits 7A and 7B, respectively, coded data volume or content detection circuits 41A and 41B for detecting coded data volumes of the encoder circuits 7A and 7B on the basis of a control signal from the control signal generator circuit 3, respectively, a comparator 42 for comparing respective outputs from these detection circuits 41A and 41B, a coded data output control circuit 43 for sending a switching signal so that an output from the encoder circuit 7A or 7B having a smaller data volume on the basis of an output from the comparator 42, and a changeover switch $SW_4$ having a fixed contact a to which picture data from the first buffer memory circuit 9A is delivered, a fixed contact b to which picture data from the second buffer memory circuit 9B is delivered, and a movable contact c switched by a switching signal from the control circuit 43.

The operation of the sixth embodiment will now be described. Initially, the picture content change quantity judgment circuit 10 detects an amount of change of the picture content between adjacent frames in a moving picture signal delivered to the input terminal 1 to output a judgment signal when the amount of change exceeds a predetermined value. When the judgment signal from the judgment circuit 10 is delivered to the memory read control circuit 5, this control circuit 5 identifies which portion of N successive frames is caused to correspond to the judgment signal to deliver a read control signal to a predetermined one of N memories through the line 6 in accordance with a pattern of a read sequence of moving picture signals from the N memories of the memory unit determined in advance in correspondence with the above identifying operation. Thus, a read operation from the memories concerned of the memory unit is carried out. The moving picture signal which has been read from the memory unit is delivered to the interframe predictive error detection circuit 34 and the intraframe orthogonal transform circuit 33.

The first detection circuit 30C operates as follows. The interframe predictive error detection circuit 34 detects an interframe predictive error to deliver it to the interframe orthogonal transform circuit 33. Thus, an intraframe orthogonal transform coefficient generated in the intraframe orthogonal transform circuit 33 is delivered to the encoder circuit 7A. Thus, efficiently compressed picture data is delivered to the buffer memory circuit 9A, the coded data content detection circuit 41A, and the decoding/reproducing circuit 8. The moving picture signal decoded and reproduced by the decoding/reproducing circuit 8 is delivered to the interframe predictive error detection circuit 34. Further, picture data outputted from the buffer memory circuit 9A is delivered to the fixed contact a of the changeover switch SW$_4$.

The intraframe orthogonal transform circuit 33 of the second detection circuit 30B to which the moving picture signal which has been read out from the memory generates an intraframe orthogonal transform coefficient to deliver the orthogonal transform coefficient to the interframe predictive error detection circuit 34 to detect an interframe predictive error. The interframe predictive error detected by the interframe predictive error detection circuit 34 is delivered to the encoder circuit 7B. The efficiently compressed picture data is delivered to the buffer memory circuit 9B and the coded data content detection circuit 41B. The picture data outputted from the buffer memory circuit 9B is delivered to the fixed contact b of the changeover switch SW$_4$.

The coded data content detection circuit 41A detects coded data content outputted from the encoder circuit 7A. Further, the coded data content detection circuit 41B detects coded data content outputted from the encoder circuit 7B. Respective coded data contents detected by two coded data content detection circuits 41A and 41B are delivered to a comparator 42, at which they are compared with each other.

A signal output from the comparator 42 is delivered to a coded output control circuit 43. The data output control circuit 43 delivers, to the movable contact c, a switching control signal for allowing the changeover switch SW$_4$ to carry out switching operation so that coded data from the encoder circuit which is outputting coded data having small coded data content can be sent to the output terminal 2 through the changeover switch SW$_4$, and sends, to the output terminal 2, a discrimination signal indicating whether the coded data sent to the output terminal 2 is coded data output from the encoder circuit 7A or coded data output from the encoder circuit 7B.

As stated above, since coded data having small data content is automatically selected and is output in the sixth embodiment shown in FIG. 6, a higher efficient coding is performed.

As seen from the detailed description, a coding system comprises means for partitioning picture signals corresponding to successive frames into picture signals corresponding to individual frame groups each comprised of a predetermined number of frames to thereby provide picture signals corresponding to individual frame groups, respectively, means for detecting an amount of change of the picture content between adjacent frames in a group of frames, and means for judging whether or not the amount of change of the picture content is above a predetermined value. This coding system further includes the following signal generation means. Namely, when a frame preceding in time two successive frames which has provided the judged result that the amount of change of the picture content is above the predetermined value, it is assumed as a first frame, and the other frame of the two frames is assumed as a second frame. The signal generating means generates a picture signal corresponding to either the state where the second frame and all other frames subsequent thereto are replaced with the first frame or the state where all frames from the leading frame of a group of frames to the first frame are replaced with the second frame, to apply a predictive coding to the picture signal, or encode a moving picture signal by the technique in which the technique used in the orthogonal transform coding system are combined, or to encode a moving picture signal by the technique in which the technique used in the predictive coding system and the technique used in the orthogonal transform coding system are combined, thus to select output data having smaller data content of data respectively and individually coded by a plurality of coding systems of different types, and output selected output data. Thus, in accordance with the efficient coding system for a moving picture signal according to this invention, overflow of the buffer memory resulting from a sudden increase of coded data content can be prevented. Further, since this coding system includes, as the processing content, implementation of replacement processing of frames in a group of frames, complicated control such as frame dropping processing, etc. at the time of coding, particularly in decoding processing is not required. In this instance, since replacement of frames is selected so that replacement of frames having a small number of rewrite frames is carried out, unnatural movement is extremely reduced. In addition, since dynamic range control of quantized outputs of predictive error values or orthogonal transform coefficients is not conducted, compression of picture data can be carried out with high efficiency under the state where there is a little deterioration of picture quality such as shading of a reproduced picture, etc. over the time required for recovery of a dynamic range of at least a quantized output of a reproduced picture.

What is claimed is:

1. An efficient coding system comprising:
   partition means for partitioning picture signals corresponding to successive frames into picture signals corresponding to individual frame groups comprised of a predetermined number of frames;
   change amount detection means for detecting an amount of change of the picture content between two adjacent frames with respect to said picture signals of every individual frame group;
   judgment means for judging whether or not the amount of change of the picture content exceeds a predetermined value;
   signal generating means for generating a picture signal corresponding to any of first and second replacement states, wherein said first replacement state is a state defined as a second frame, which is the latter frame of said two adjacent frames, and all other frames subsequent thereto and to the last frame of a group of frames, are replaced with a first frame, which is the former frame of said two adjacent frames, and said second replacement state being a state defined as all frames from a leading frame of said one group of frames to said first frame being replaced with said second frame when said change of the picture content is judged to exceed said predetermined value;

error detection means for detecting a predictive error of said picture signal generated by said signal generating means; and coding means for coding said predictive error obtained by said error detection means.

2. An efficient coding system of claim 1, wherein said signal generating means comprises means for generating said picture signal corresponding to any of said first and second replacement states, wherein the number of frames from the leading frame to said first frame of said group of frames is a frame number A and the number of frames from said second frame to the last frame is a frame number B, a picture signal being generated according to said first replacement state when the frame number is "A>D" and a picture signal being generated according to said second replacement state when the frame number is "A≦B".

3. An efficient coding system of claim 1, wherein said signal generating means comprises means for generating said picture signal corresponding to any of said first and second replacement states, wherein the number of frames from the leading frame to said first frame of said group of frames is a frame number A and the number of frames from said second frame to the last frame is a frame number B, and a picture signal being generated according to of said first replacement state when the frame number is "A≦B", and a picture signal being generated according to said second replacement state when the frame number is "A>B".

4. An efficient coding system of claim 1, further comprising orthogonal transform means for orthogonally transforming said predictive error signal detected by said error detection means and to generate as output an orthogonal transformation coefficient to said coding means.

5. An efficient coding system of claim 4, wherein said signal generating means comprises means for generating said picture signal corresponding to any of said first and second replacement states, wherein the number of frames from the leading frame to said first frame of said group of frames is a frame number A and the number of frames from said second frame to the last frame is a frame number B, a picture signal being generated according to said first replacement state when the frame number is "A>B" and a picture signal being generated according to said second replacement state when the frame number is "A≦B".

6. An efficient coding system of claim 4, wherein said signal generating means comprises means for generating said picture signal corresponding to any of said first and second replacement states, wherein the number of frames from the leading frame to said first frame of said group of frames is a frame number A and the number of frames from said second frame to the last frame is a frame number B, a picture signal being generated according to said first replacement state when the frame number is "A≦B" and a picture signal being generated according to said second replacement state when the frame number is "A>B".

7. An efficient coding system of claim 1, wherein said judgment means comprises comparison means for comparing a total sum of absolute values of difference between picture signals of said two adjacent frames in each frame group, with a predetermined threshold value.

8. An efficient coding system of claim 1, and further comprising orthogonal transform means for orthogonally transforming said picture signal generated by said signal generating means and for generating as output an orthogonal transformation coefficient to said error detection means, and wherein said error detection means detects a predictive error of said orthogonal transformation coefficient generated by said orthogonal transform means.

9. An efficient coding system of claim 8, wherein said signal generating means comprises means for generating said picture signal corresponding to any of said first and second replacement states, wherein the number of frames from the leading frame to said first frame of said group of frames is a frame number A and the number of frames from said second frame to the last frame is a frame number B, a picture signal being generated according to said first replacement state when the frame number is "A>B" and a picture signal being generated according to said second replacement state when the frame number is "A≦B".

10. An efficient coding system of claim 8, wherein said signal generating means comprises means for generating said picture signal corresponding to any of said first and second replacement states, wherein the number of frames from the leading frame to said first frame of said group of frames is a frame number A and the number of frames from said second frame to the last frame is a frame number B, a picture signal being generated according to said first replacement state when the frame number is "A≦B" and a picture signal being generated according to said second replacement state when the frame number is "A>B".

11. An efficient coding system of claim 10, wherein said judgment means comprises comparison means for comparing a total sum of absolute values of differences between picture signals of said two adjacent frames in each frame group, with a predetermined threshold value.

12. An efficient coding system comprising:

partition means for partitioning picture signals corresponding to successive frames into picture signals corresponding to individual frame groups comprised of a predetermined number of frames;

change amount detection means for detecting an amount of change of the picture content between two adjacent frames with respect to said picture signals of every individual frame group;

judgment means for judging whether or not the amount of change of the picture content exceeds a predetermined value;

signal generating means for generating a picture signal corresponding to any of first and second replacement states, wherein said first replacement state is a state defined as a second frame, which is the latter frame of said two adjacent frames, and all other frames subsequent thereto and to the last frame of a group of frames, are replaced with a first frame, which is the former frame of said two adjacent frames, and said second replacement state being a state defined as all frames from a leading frame of said one group of frames to said first frame being replaced with said second frame when said change of the picture content is judged to exceed said predetermined value;

first error detection means for detecting said predictive error of said picture signal generated by said signal generating means, thereby generating a first predictive error;

first orthogonal transform means for orthogonally transforming said predictive error output from said first error detection means, thereby generating a first orthogonal transformation coefficient;

first coding means for coding said first orthogonal transformation coefficient, thereby generating first coded data;

second orthogonal transform means for orthogonally transforming said picture signal output from said signal generating means, thereby generating a second orthogonal transformation coefficient;

second error detection means for detecting said second orthogonal transformation coefficient generated by said second orthogonal transform means, thereby generating a second predictive error;

second coding means for coding said predictive error coefficient generated by said second error detection means, thereby generating second coded data; and data selection means for comparing said first and second data respectively generated from said first and second coding means, and selecting and supplying as output the coded data of said first and second coded data which is smallest in amount.

13. An efficient coding system of claim 12, wherein said judgment means comprises comparison means for comparing a total sum of absolute values of differences between picture signals of said two adjacent frames in each frame group, with a predetermined threshold value.

* * * * *